US009722442B2

(12) United States Patent
Berry et al.

(10) Patent No.: US 9,722,442 B2
(45) Date of Patent: Aug. 1, 2017

(54) SYSTEM AND METHOD FOR TRANSFERRING ENERGY BETWEEN VEHICLES

(71) Applicant: General Electric Company, Schenectady, NY (US)

(72) Inventors: Irene Michelle Berry, Niskayuna, NY (US); Herman Lucas Norbert Wiegman, Niskayuna, NY (US); Timothy Gerard Richter, Niskayuna, NY (US); Dann Gwyn, Niskayuna, NY (US); Patrick Lee Jansen, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/972,887

(22) Filed: Dec. 17, 2015

(65) Prior Publication Data
US 2016/0118828 A1 Apr. 28, 2016

Related U.S. Application Data

(63) Continuation-in-part of application No. 14/525,285, filed on Oct. 28, 2014.
(Continued)

(51) Int. Cl.
*E21C 31/12* (2006.01)
*E21F 13/06* (2006.01)
*E21F 13/08* (2006.01)
*E21F 17/06* (2006.01)
*B60K 1/04* (2006.01)
*B60L 5/00* (2006.01)
(Continued)

(52) U.S. Cl.
CPC .............. *H02J 7/0054* (2013.01); *B60K 1/04* (2013.01); *B60L 5/00* (2013.01); *B60L 11/18* (2013.01);
(Continued)

(58) Field of Classification Search
CPC  E21C 31/12; E21F 13/00; E21F 13/06; E21F 13/063; E21F 13/08; E21F 17/04; E21F 17/06; B60L 5/00
(Continued)

(56) References Cited

U.S. PATENT DOCUMENTS 4,087,734 A * 5/1978 Blutreich ................. H02J 9/00
191/4
4,700,023 A 10/1987 Hillmann et al.
(Continued)

FOREIGN PATENT DOCUMENTS

CN     203047261     7/2016
EP     2669110       12/2013

*Primary Examiner* — David Bagnell
*Assistant Examiner* — Michael Goodwin
(74) *Attorney, Agent, or Firm* — Global Patent Operation; John A. Kramer

(57) ABSTRACT

An embodiment of the present invention relates to a vehicle. The vehicle includes an energy storage device and a traction motor electrically connected to the energy storage device. The traction motor is configured to convert electrical energy supplied by the energy storage device into a mechanical output to propel the vehicle. The vehicle also includes a vehicle connecting mechanism electrically coupled to the energy storage device and being configured for electrical coupling with a second vehicle connecting mechanism of a second vehicle to establish an electrical interface between the vehicle and the second vehicle. The electrical interface enables the transfer of electric power between the vehicle and the second vehicle.

8 Claims, 2 Drawing Sheets

Related U.S. Application Data

(60) Provisional application No. 62/098,810, filed on Dec. 31, 2014.

(51) Int. Cl.
 *H02J 7/00* (2006.01)
 *B60L 11/18* (2006.01)

(52) U.S. Cl.
 CPC ....... *B60L 11/1801* (2013.01); *B60L 11/1818* (2013.01); *E21C 31/12* (2013.01); *E21F 13/063* (2013.01); *E21F 13/08* (2013.01); *E21F 17/06* (2013.01); *H02J 7/0042* (2013.01); *Y02T 10/7088* (2013.01)

(58) Field of Classification Search
 USPC ..................................................... 180/207.3
 See application file for complete search history.

(56) References Cited

U.S. PATENT DOCUMENTS

| | | | |
|---|---|---|---|
| 5,003,236 A * | 3/1991 | Harless | B60K 1/04 180/202 |
| 5,810,134 A * | 9/1998 | Strack | E21F 17/06 104/93 |
| 7,193,393 B1 | 3/2007 | Payne | |
| 7,828,270 B2 | 11/2010 | Duvall | |
| 7,913,782 B1 * | 3/2011 | Foss | B60D 1/00 180/14.4 |
| 8,421,266 B2 | 4/2013 | Kumar | |
| 8,428,802 B2 * | 4/2013 | Kizaki | B60L 9/00 105/35 |
| 8,583,303 B2 | 11/2013 | Bastien | |
| 2006/0273756 A1 * | 12/2006 | Bowling | H02J 7/0004 320/107 |
| 2010/0148567 A1 * | 6/2010 | McClure | E21C 27/24 299/64 |
| 2011/0301794 A1 * | 12/2011 | Bastien | E21F 13/00 701/22 |
| 2012/0043172 A1 * | 2/2012 | Ichikawa | B60L 5/005 191/45 R |
| 2013/0002198 A1 | 1/2013 | McCluskey et al. | |
| 2013/0119745 A1 * | 5/2013 | Zimmerman | E21F 13/00 299/18 |
| 2013/0175973 A1 | 7/2013 | Jones et al. | |
| 2015/0090554 A1 * | 4/2015 | Mazumdar | B60L 5/00 191/33 R |

* cited by examiner

SYSTEM AND METHOD FOR TRANSFERRING ENERGY BETWEEN VEHICLES

CROSS-REFERENCE TO RELATED APPLICATIONS

This application is a continuation-in-part of U.S. application Ser. No. 14/525,285, filed Oct. 28, 2014, and also claims priority to U.S. Provisional Application No. 62/098,810, filed Dec. 31, 2014, both of which are incorporated by reference herein in their entireties.

FIELD OF THE INVENTION

Embodiments of the invention relate generally to material transfer and transport. Other embodiments relate to a system and method for transferring energy between material transfer and transport vehicles.

BACKGROUND OF THE INVENTION

Material movement is a challenging aspect of many industries, particularly in the underground mining industry. Traditional material movement solutions have relied on diesel fuel and engines to provide power to mining equipment such as continuous miners, material loaders and haulers. Emissions, however, are potentially problematic for underground operations, as the heat rejected from the engine and the carbon emissions during operation must be removed from the mine through a ventilation system. Carbon emissions from the utilization of diesel-powered engines also contribute to increased equipment costs because of the provision, regeneration and maintenance of after-treatment filters that are necessary to capture such emissions.

In view of the drawbacks associated with diesel-powered vehicles and machinery, there has been a shift in the industry towards electrified mines. In electrified mines, electrical power is utilized as the motive power for mining equipment, for example, to power vehicles and machinery that load excavated material and then haul the material over a route to a tipping point where it is unloaded. When the haul route is located far from the electrical distribution system and/or in harsh environmental conditions, however, installing, inspecting and maintaining the cables and components of system that support the loading and hauling machinery operating along the haul route can be costly.

In view of the above, there is a need for a system and method for powering mining machinery and equipment utilized for material transfer and transport within a mine. In particular, there is a need for a system and method for transferring energy between material transfer and transport vehicles.

BRIEF DESCRIPTION OF THE INVENTION

An embodiment of the present invention relates to a vehicle. The vehicle includes an energy storage device and a traction motor electrically connected to the energy storage device. The traction motor is configured to convert electrical energy supplied by the energy storage device into a mechanical output to propel the vehicle. The vehicle also includes a vehicle connecting mechanism electrically coupled to the energy storage device and being configured for electrical coupling with a second vehicle connecting mechanism of a second vehicle to establish an electrical interface between the vehicle and the second vehicle. The electrical interface enables the transfer of electric power between the vehicle and the second vehicle. The vehicle is configured to transfer the electric power from the energy storage device to the second vehicle to power at least one operation of the second vehicle, wherein the at least one operation includes a movement of the second vehicle from a first location to the second location when the electrical interface is established, and whereby the energy storage device of the vehicle transfers the electric power to a second traction motor of the second vehicle to effect the movement of the second vehicle.

Another embodiment of the present invention relates to a system. The system includes a first vehicle and a second vehicle configured to be selectively coupled to the first vehicle to establish an electrical interface therebetween. The electrical interface is configured to enable the transfer of power from one of the first vehicle and the second vehicle to the other of the first vehicle and the second vehicle. The second vehicle is configured to transfer power from the second energy storage device to the first vehicle to power at least one operation of the first vehicle, the at least one operation includes a movement of the first vehicle from a first location to the second location, the second energy storage device is configured to supply electric power to the first traction motor of the first vehicle, and the first traction motor is configured to convert the electric power from the second energy storage device into a mechanical output to effect the movement of the first vehicle.

Yet another embodiment of the present invention relates to a method. The method includes the steps of electrically connecting a first vehicle to a second vehicle through an interface and transferring electric power from one of the first vehicle and the second vehicle to the other of the first vehicle and the second vehicle. The step of transferring electric power includes transferring electric power from the second vehicle to the first vehicle to power at least one operation of the first vehicle, the at least one operation includes a movement of the first vehicle from a first location to the second location, the first vehicle includes a first traction motor, the second vehicle is configured to supply electric power to the first traction motor of the first vehicle, and the first traction motor is configured to convert the electric power from the second energy storage device into a mechanical output to effect the movement of the first vehicle.

BRIEF DESCRIPTION OF THE DRAWINGS

The present invention will be better understood from reading the following description of non-limiting embodiments, with reference to the attached drawings, wherein below.

DETAILED DESCRIPTION OF THE INVENTION

Figure 1:
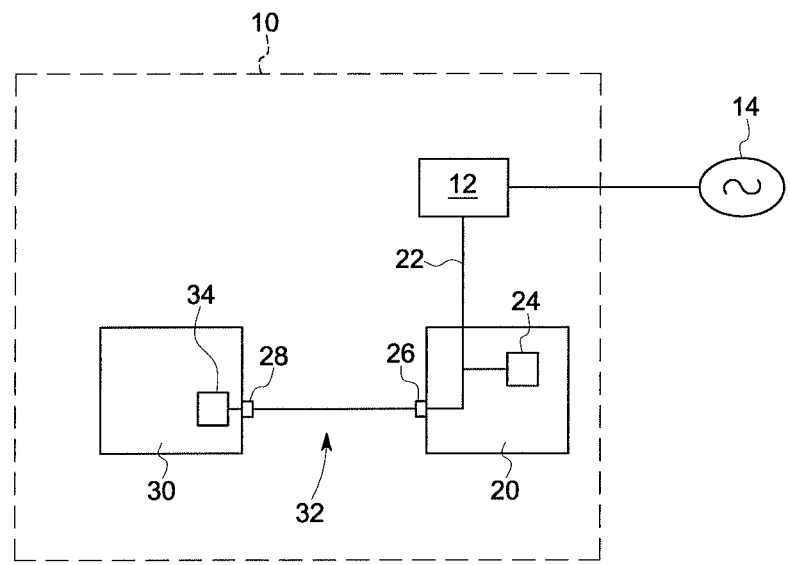
FIG. 1 is a schematic view of a system for transferring electrical energy between vehicles, according to an embodiment of the present invention.

Reference will be made below in detail to exemplary embodiments of the invention, examples of which are illustrated in the accompanying drawings. Wherever possible, the same reference numerals used throughout the drawings refer to the same or like parts. Although exemplary embodiments of the present invention are described with respect to mining machinery and equipment and, in particular, to loading and hauling vehicles, embodiments of the invention may also be applicable for use with vehicles and machinery generally.

As used herein, "electrical contact," "electrical communication" and "electrically coupled" means that the referenced elements are directly or indirectly connected such that an electrical current may flow from one to the other. The connection may include a direct conductive connection (i.e., without an intervening capacitive, inductive or active element), an inductive connection, a capacitive connection, and/or any other suitable electrical connection. Intervening components may be present. As used herein, "electrical interface" refers to an area or component(s) where two systems or devices meet and interact such that the two systems are electrically coupled to one another. As used herein, "selectively coupled" means that a component may be coupled to another component in one mode of operation, and decoupled with the another component in another mode of operation.

Embodiments of the present invention relate to a vehicle. The vehicle includes an energy storage device and a traction motor electrically connected to the energy storage device. The traction motor is configured to convert electrical energy supplied by the energy storage device into a mechanical output to propel the vehicle. The vehicle also includes a vehicle connecting mechanism electrically coupled to the energy storage device and being configured for electrical coupling with a second vehicle connecting mechanism of a second vehicle to establish an electrical interface between the vehicle and the second vehicle. The electrical interface enables the transfer of electric power between the vehicle and the second vehicle.

Other embodiments of the present invention relate to a system. The system includes a first vehicle and a second vehicle configured to be selectively coupled to the first vehicle to establish an electrical interface therebetween. The electrical interface is configured to enable the transfer of power from one of the first vehicle and the second vehicle to the other of the first vehicle and the second vehicle. The second vehicle is configured to transfer power from the second energy storage device to the first vehicle to power at least one operation of the first vehicle, the at least one operation includes a movement of the first vehicle from a first location to the second location, the second energy storage device is configured to supply electric power to the first traction motor of the first vehicle, and the first traction motor is configured to convert the electric power from the second energy storage device into a mechanical output to effect the movement of the first vehicle.

Yet other embodiments of the present invention relates to a method. The method includes the steps of electrically connecting a first vehicle to a second vehicle through an interface and transferring electric power from one of the first vehicle and the second vehicle to the other of the first vehicle and the second vehicle. The step of transferring electric power includes transferring electric power from the second vehicle to the first vehicle to power at least one operation of the first vehicle, the at least one operation includes a movement of the first vehicle from a first location to the second location, the first vehicle includes a first traction motor, the second vehicle is configured to supply electric power to the first traction motor of the first vehicle, and the first traction motor is configured to convert the electric power from the second energy storage device into a mechanical output to effect the movement of the first vehicle.

With reference to FIG. 1, a typical electrified mine installation 10 includes a power distribution system 12 that is electrically coupled to a main power grid 14 and/or local power generating equipment and receives a supply of electrical power therefrom. The power distribution system 10 may include a power substation containing electrical switchgear such as circuit breakers, fuses, switches, transformers and the like that is utilized for the purpose of controlling power from the main power grid 14 to the underground mine 10. As will be readily appreciated, a network of cables running from the power distribution system 12 into the mine 10 supplies power to lights, ventilation equipment, mining machinery equipment, and the like. For example, the power distribution system 12 may supply electrical power to a mining machine, such as first vehicle 20 through a first electrical cable 22. The electrical cable runs from the power distribution system 12 (or otherwise forms a part thereof), and may be selectively connected to the vehicle 20 in a manner known in the art. Additional cables may supply power to other electrically-driven mining machinery, systems and vehicles, as is known the art. In an embodiment, the electrical power supplied to the vehicle 20 through cable 22 may be utilized for vehicle operation and to control various implements of the vehicle in order to perform various vehicle-specific tasks, as is known in the art.

With further reference to FIG. 1, in an embodiment, the mining vehicle 20 may have an on-board energy storage device 24 that may be re-charged when the vehicle 20 is connected to the power distribution system 12, and a first vehicle connection, such as vehicle connecting mechanism 26, configured for electrical coupling with a corresponding second vehicle connection, such as vehicle connecting mechanism 28, of a second vehicle 30. As used herein, "vehicle connecting mechanism" refers to a component or assembly of components that enables a first vehicle to be electrically coupled to a second vehicle to establish an electrical interface therebetween.

In an embodiment, the first vehicle connection 26 and second vehicle connection 28 of the first and second vehicles 20, 30 form an interface 32 over which electrical power may be transferred from the first vehicle 20 to the second vehicle 30 and/or from the second vehicle 30 to the first vehicle 20, in the manner discussed hereinafter. The interface 32 provides an electrical connection between the first vehicle 20 and the second vehicle 30 so that power may be transferred between the vehicles to the other to sustain operation of one of the vehicles over a totality or a portion of its operating cycle. In particular, in an embodiment, the interface 32 allows electrical power to be transferred from the first vehicle 20 to the second vehicle 30 and, specifically, to an energy storage device 34 of the second vehicle 30 in order to charge the energy storage device 34.

Figure 2:
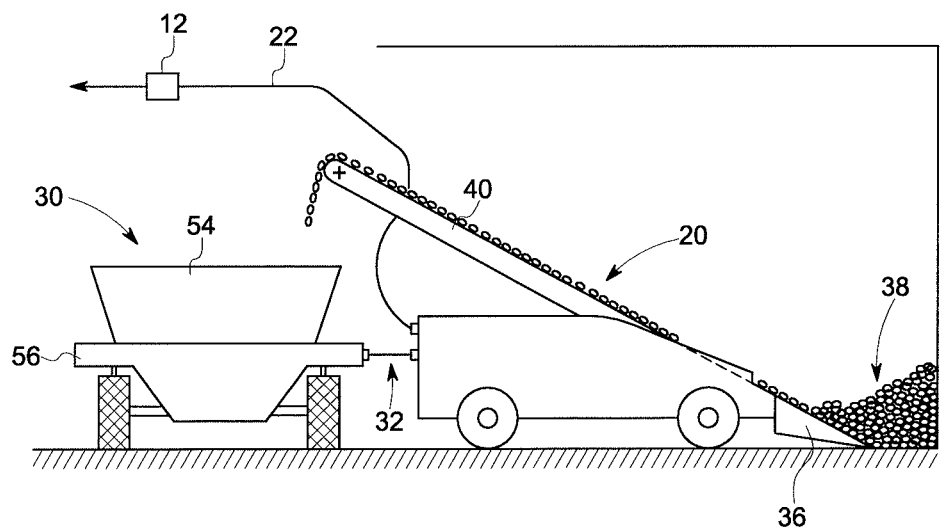
FIG. 2 is a side-elevational view of the system of FIG. 1, illustrating the interface between a first vehicle and a second vehicle.
Figure 3:
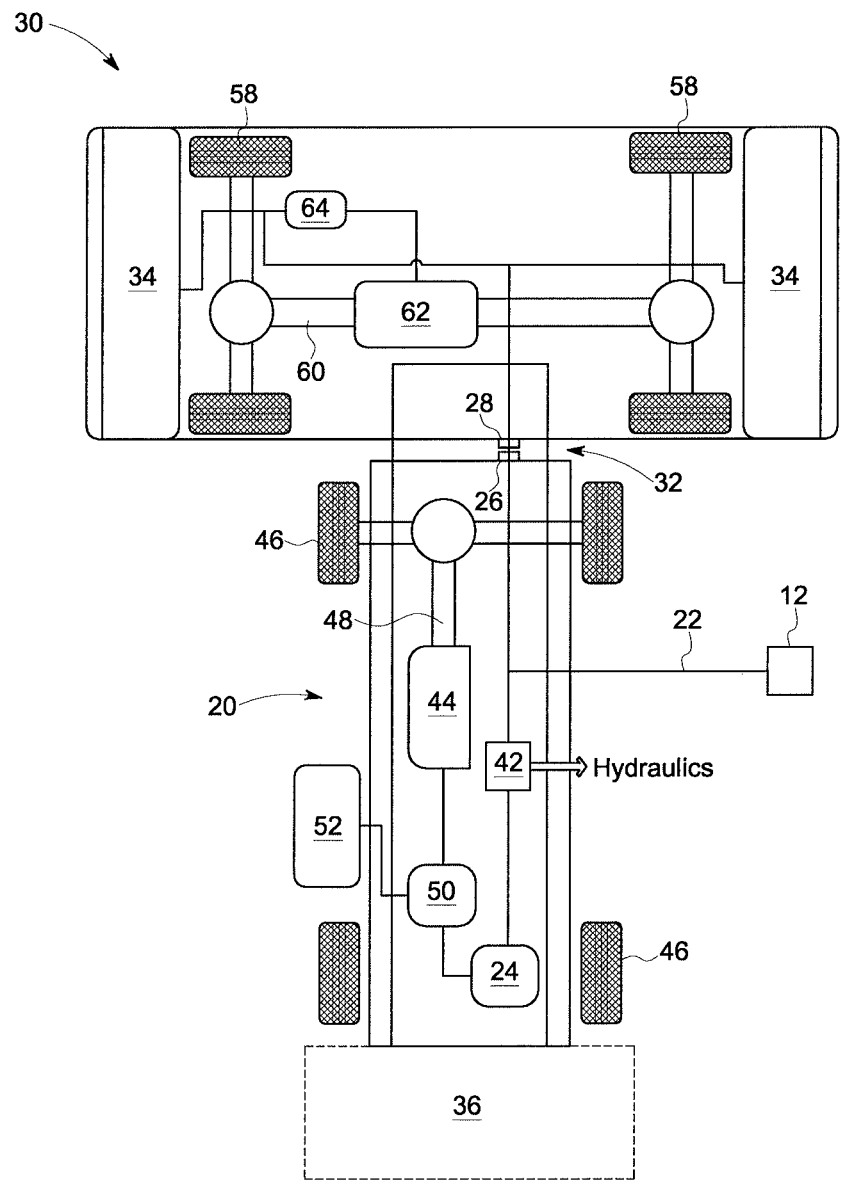
FIG. 3 is a schematic view of the another schematic view of the system of FIG. 1, illustrating the internal components of the first and second vehicles.

Turning now to FIGS. 2 and 3, in an embodiment, the first vehicle 20 is a material loading vehicle (e.g., a continuous miner) and the second vehicle 30 is a material hauling vehicle (e.g., a hauler). As illustrated therein, the material loading vehicle 20 may include a cutting head (not shown) configured to cut into the exposed face of a mine under the control of an operator, a scoop 36 configured to receive material 38 after it has been cut from the mine by the cutting head, and a conveyor 40 configured to transfer the material from the scoop 36 to the haul vehicle 30 so that it may be removed from the mine. An electrically-driven hydraulic pump 42 may provide a source of power for a hydraulic assembly that may be selectively operated to raise and lower the cutting head, as is known in the art.

The loading vehicle 20 may also include a traction motor 44 coupled to the wheels 46 of the loading vehicle 20 via a drive shaft 48 for propelling the vehicle 20 under direction of an on-board control unit 50. An operator control panel or interface 52 electrically coupled to the control unit 50 provides a means for an operator to manually or remotely control operation of the vehicle 20 from a safe distance from the exposed face of the mine. As discussed above, the loading vehicle 20 may also include an energy storage device, such as battery 24, that is electrically connected to the traction motor 44. The traction motor 44 is configured to receive electrical energy from the battery 24 and convert the electrical energy to a mechanical output to rotate the drive shaft 48, and thus the wheels 46 to selectively move the loading vehicle 20 from one location to another within a mine, as discussed in detail hereinafter.

As also illustrated in FIGS. 2 and 3, the hauling vehicle 30 includes a bed 54, a frame 56 supporting the bed 54, and plurality of wheels 58 connected to a drive shaft 60. The hauling vehicle 30 also includes at least one traction motor 62 and at least one energy storage device, such as batteries 34, electrically connected to the traction motor 62. The traction motor 62 is configured to receive stored electrical energy from the batteries 34 and convert the electrical energy to mechanical energy in order to rotate the drive shaft 60 to drive the wheels 58 to propel the vehicle 30. In an embodiment, the traction motor may be a wheel motor, in which case there would be no drive shaft present. An on board control unit 64 is electrically connected to the batteries 34 and the traction motor 62 for selectively controlling the operation thereof in response to inputs from an operator or according to a control routine stored in memory.

As will be readily appreciated, the loading vehicle 20 is configured to transfer electrical power to the hauling vehicle 30 through interface 32 to charge the batteries 34 of the hauling vehicle 30 when the vehicles are electrically interconnected, in the manner discussed hereinafter.

In an embodiment, the loading vehicle 20 may be positioned at a material draw point within a mine and connected to the power distribution system 12 of the mine via cable 22 running from the power distribution system. This connection provides power to the loading vehicle 20 so that the vehicle may carry out cutting and loading operations, such as removing material from a face of the mine utilizing the cutting head and transferring the material via the scoop 36 and conveyor 40. In addition, this connection provides power to recharge the battery 24 on-board the loading vehicle 20.

The hauling vehicle 30 is then moved to the haul point behind the loading vehicle 20 under power from the on-board batteries 34 and positioned beneath the conveyor 40 of the loading vehicle 20. The interface 32 is established by electrically connecting connection 26 with connection 28. Through this interface 32, the hauling vehicle 30 may draw energy from the loading vehicle 20 during the loading cycle (i.e., while the loading vehicle 20 is transferring material 38 to the bed 54 of the hauling vehicle 30) to recharge the on-board batteries 34 of the hauling vehicle 30. Once the bed 54 of the hauling vehicle 30 is full, the hauling vehicle may be trammed along a haul route to a tipping point under power from the batteries 34. As will be readily appreciated, by charging the hauling vehicle 30 by an electrical connection with the loading vehicle 20, the need to deploy charging stations along the haul route to charge the hauling vehicle, or to run electrical cables to the hauling vehicle 30 throughout the length of the haul route to power the vehicle may be obviated. With the present invention, the hauling vehicle 20 may be recharged each time it returns to the material draw point and without having to deviate from the most direct-path haul route. Accordingly, mine production and overall efficiency may be increased, while decreasing operating costs.

When it is desirable to move the loading vehicle 20 to another location within the mine, the same can be accomplished utilizing the stored energy in the on-board battery 24. Once the loading vehicle 20 is positioned in a new location, it can be connected to the power distribution system 12 once again to enable recharging of the battery 24, and operations may continue in the manner hereinbefore described.

In another embodiment, only the hauling vehicle 30 has an on-board battery (i.e., the loading vehicle 20 does not have a battery for storing electrical energy supplied by the power distribution system 12). In this embodiment, mining operations of the loading vehicle 20 are powered by the electrical connection to the power distribution system 12, and the batteries 34 of the hauling vehicle 30 are recharged via the interface 32 during the loading cycle, in the manner discussed above. When it is desirable to move the loading vehicle 20 from one location to another, the hauling vehicle 30 remains coupled to the loading vehicle 20 through the interface 32 and powers the loading vehicle 20. In particular, the batteries 34 of the hauling vehicle may be utilized to supply power to both the traction motor 62 of the hauling vehicle 30 as well as the traction motor 44 of the loading vehicle 20 to propel both vehicles. In an embodiment, a mechanical connection may be established between the hauling vehicle 20 and the loading vehicle 30 such that the hauling vehicle 30 may physically pull or tow the loading vehicle 30 under power from batteries 34.

In yet another embodiment, the hauling vehicle 30 is substantially as described above and includes an on-board energy storage device, such as batteries 34, and a second vehicle connection 28 for establishing interface 32 through electrical coupling with the first vehicle connection 26 of the loading vehicle 20. The loading vehicle 20, however, is not connected to the power distribution system 12 of the mine. In this embodiment, once interface 32 is established, electrical power is provided by the batteries 34 of the hauling vehicle 30, over interface 32, to the loading vehicle 20 to power the loading vehicle 20 during the loading cycle. As will be readily appreciated, in this embodiment, neither the loading vehicle 20 nor the hauling vehicle 30 require a physical connection to the power distribution system 12 of the mine. In this case, the batteries 34 of the hauling vehicle 30 may be recharged following battery exchange and/or during a rapid recharge of all or part of the discharged capacity at either a recharging station within the mine installation or by the loading vehicle 20 when the loading vehicle 20 is once again connected to the power distribution system 12. Accordingly, in an embodiment, the loading vehicle 20 may be selectively powered by the hauling vehicle 30 or by a direct electrical connection with the power distribution system 12 of the mine.

In an embodiment, both the hauling vehicle 30 and the loading vehicle 20 may be outfitted with wireless communications devices or other communication means for establishing a communications link between the vehicles. This communications link is configured to allow an operator of the hauling vehicle 30 to control operation of the loading vehicle 20, and/or vice versa. For example, the communications link allows an operator of the hauling vehicle to control operation of the loading vehicle 20 from the hauling vehicle 30.

As will be readily appreciated, the embodiments of the system and method described thereof provide for reduced capital investment by reducing the need for electrical infrastructure. In particular, by coupling the hauling vehicle to the loading vehicle for at least part of the load-haul cycle to facilitate the transfer of power therebetween, there is no longer a need to directly power each vehicle with dedicated electrical lines for the duration of the cycle or the entirety of the haul route. In addition, the present invention provides for reduced capital investment by reducing the size of the on-board energy storage devices. In particular, by enabling recharging of the energy storage devices at points along the haul route (i.e., wherever a loading vehicle and haul vehicle come into contact with one another), larger capacity batteries that are typically needed to reach deep into a mine from a single, remote charging station no longer need to be utilized.

While the present invention has been heretofore described as a system that provides an electrical connection between a first vehicle and a second vehicle so that power may be transferred from one vehicle to the other to sustain operation of one of the vehicles over a totality or a portion of its operating cycle, the present invention is not intended to be so limited in this regard. In particular, it is contemplated that the coupling between the vehicles may be conductive, magnetic, mechanical and/or hydraulic in addition to, or in lieu of, the electrical coupling.

In addition, while embodiments of the present invention have been described in connection with a single hauling vehicle and a single loading vehicle, the present invention is equally applicable to a fleet of hauling vehicle and a fleet of loading vehicles. For example, one or more hauling vehicles of the present invention may be configured interface with a fleet of loading vehicles positioned within a mine to conducting mining operations throughout the mine.

An embodiment of the present invention relates to a vehicle. The vehicle includes an energy storage device and a traction motor electrically connected to the energy storage device. The traction motor is configured to convert electrical energy supplied by the energy storage device into a mechanical output to propel the vehicle. The vehicle also includes a vehicle connecting mechanism electrically coupled to the energy storage device and being configured for electrical coupling with a second vehicle connecting mechanism of a second vehicle to establish an electrical interface between the vehicle and the second vehicle. The electrical interface enables the transfer of electric power between the vehicle and the second vehicle. The vehicle is configured to transfer the electric power from the energy storage device to the second vehicle to power at least one operation of the second vehicle, wherein the at least one operation includes a movement of the second vehicle from a first location to the second location when the electrical interface is established, and whereby the energy storage device of the vehicle transfers the electric power to a second traction motor of the second vehicle to effect the movement of the second vehicle. As used herein, "at least one operation" refers to the performance of a function or a change in a condition of the vehicle, such as, for example, the change of a position of the vehicle.

In an embodiment, the vehicle is a mine hauling vehicle and the second vehicle is a mine loading vehicle, and the at least one operation includes a loading operation whereby material is transferred from the loading vehicle to the hauling vehicle.

In an embodiment, the vehicle is configured to transfer the electric power to a second energy storage device of the second vehicle to charge the second energy storage device.

In an embodiment, the vehicle is configured to be electrically coupled to a supply of electric power and to receive electric power therefrom. The electric power from the supply may be utilized by the vehicle to charge the energy storage device of the vehicle whether or not the electrical interface is established, and to charge the second energy storage device of second vehicle when the electrical interface between the vehicle and the second vehicle is established.

Another embodiment of the present invention relates to a system. The system includes a first vehicle and a second vehicle configured to be selectively coupled to the first vehicle to establish an electrical interface therebetween. The electrical interface is configured to enable the transfer of power from one of the first vehicle and the second vehicle to the other of the first vehicle and the second vehicle. The second vehicle is configured to transfer power from the second energy storage device to the first vehicle to power at least one operation of the first vehicle, the at least one operation includes a movement of the first vehicle from a first location to the second location, the second energy storage device is configured to supply electric power to the first traction motor of the first vehicle, and the first traction motor is configured to convert the electric power from the second energy storage device into a mechanical output to effect the movement of the first vehicle.

In an embodiment, the first vehicle is configured to be electrically coupled to a supply of electric power and to receive electric power therefrom.

In an embodiment, the supply of electric power is a power distribution system for an underground mine. The first vehicle may be a mine loading vehicle for loading material excavated from the mine, the second vehicle may be a mine hauling vehicle for hauling the material after it is transferred by the loading vehicle to the hauling vehicle.

In an embodiment, the first vehicle includes a first energy storage device and a first traction motor electrically connected to the first energy storage device. The electric power from the supply may charges the first energy storage device, the first energy storage device is configured to supply the electric power to the first traction motor under direction of a control unit, and the first traction motor is configured to convert the electric power from the energy storage device into a mechanical output to propel the first vehicle.

In an embodiment, the second vehicle includes a second energy storage device. The first vehicle may be configured to transfer the electric power from the supply to the second energy storage device of the second vehicle through the interface to charge the second energy storage device.

In an embodiment, the first vehicle is a mine loading vehicle and the second vehicle is a mine hauling vehicle, and the at least one operation includes a loading operation whereby material is transferred from the loading vehicle to the hauling vehicle.

Yet another embodiment of the present invention relates to a method. The method includes the steps of electrically connecting a first vehicle to a second vehicle through an interface and transferring electric power from one of the first vehicle and the second vehicle to the other of the first vehicle and the second vehicle. The step of transferring electric power includes transferring electric power from the second vehicle to the first vehicle to power at least one operation of the first vehicle, the at least one operation includes a movement of the first vehicle from a first location to the second location, the first vehicle includes a first traction motor, the second vehicle is configured to supply electric power to the first traction motor of the first vehicle, and the first traction motor is configured to convert the electric power from the second energy storage device into a mechanical output to effect the movement of the first vehicle.

In an embodiment, the method may also include the step of, prior to electrically connecting the first vehicle to the second vehicle, electrically connecting the first vehicle to a supply of electric power.

In an embodiment, the step of transferring electric power includes transferring electric power from the first vehicle to a battery of the second vehicle to recharge the battery while the first vehicle performs an operation that is different from a recharging operation.

In an embodiment, the method may include the step of charging a battery of the first vehicle with the supply of electric power.

In an embodiment, the first vehicle is a mine loading vehicle and the second vehicle is a mine hauling vehicle, and the at least one operation includes a loading operation whereby material is transferred from the loading vehicle to the hauling vehicle.

What is claimed is:

1. A method, comprising the steps of:
    electrically connecting a first vehicle to a supply of electric power;
    electrically connecting the first vehicle to a second vehicle through an interface;
    while the first vehicle is connected to the supply of electric power, transferring electric power from the first vehicle to a battery of the second vehicle to recharge the battery while the first vehicle performs an operation that is different from a recharging operation;
    decoupling the first vehicle from the supply of electric power; and
    while the first vehicle is decoupled from the supply of electric power, transferring electric power from the second vehicle to the first vehicle to power at least one operation of the first vehicle;
    wherein the at least one operation includes a movement of the first vehicle from a first location to a second location;
    wherein the first vehicle includes a first traction motor;
    wherein the second vehicle is configured to supply electric power to the first traction motor of the first vehicle;
    wherein the first traction motor is configured to convert the electric power from the battery of the second vehicle into a mechanical output to effect the movement of the first vehicle.

2. The method according to claim 1, further comprising the step of:
    charging a battery of the first vehicle with the supply of electric power.

3. The method according to claim 1, wherein:
    the first vehicle is a mine loading vehicle and the second vehicle is a mine hauling vehicle; and
    the at least one operation includes a loading operation whereby material is transferred from the loading vehicle to the hauling vehicle.

4. The method according to claim 3, further comprising the step of:
    charging a battery of the first vehicle with the supply of electric power.

5. A method, comprising the steps of:
    electrically connecting a first vehicle to a supply of electric power, wherein the first vehicle includes a first traction motor;
    electrically connecting the first vehicle to a second vehicle through an interface;
    while the first vehicle is connected to the supply of electric power, transferring electric power from the first vehicle to a battery of the second vehicle to recharge the battery while the first vehicle performs an operation that is different from a recharging operation;
    decoupling the first vehicle from the supply of electric power; and
    while the first vehicle is decoupled from the supply of electric power, transferring electric power from the second vehicle to the first traction motor of the first vehicle to power movement of the first vehicle from a first location to a second location, wherein the first traction motor is configured to convert the electric power from the second vehicle into a mechanical output to effect the movement of the first vehicle.

6. The method according to claim 5, further comprising the step of:
    charging a battery of the first vehicle with the supply of electric power.

7. The method according to claim 5, wherein:
    the first vehicle is a mine loading vehicle and the second vehicle is a mine hauling vehicle; and
    the operation includes a loading operation whereby material is transferred from the loading vehicle to the hauling vehicle.

8. The method according to claim 7, further comprising the step of:
    charging a battery of the first vehicle with the supply of electric power.

* * * * *